(12) United States Patent
Ross et al.

(10) Patent No.: US 10,029,780 B2
(45) Date of Patent: Jul. 24, 2018

(54) STIFFENED COMPOSITE PANELS

(71) Applicant: The Boeing Company, Chicago, IL (US)

(72) Inventors: Joshua Amory Ross, Bothell, WA (US); Shane Frank Cuda, Long Beach, CA (US); Mark Ronald McLaughlin, Snohomish, WA (US); Michael Robert Rush, Arlington, WA (US); Colin Lee Farr, Lynnwood, WA (US); David Bruce Smith, Renton, WA (US); Nihar Ashokkumar Desai, Bothell, WA (US); Thomas Joseph Kennedy, Bonney Lake, WA (US); Lyle Ray Deobald, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 65 days.

(21) Appl. No.: 14/902,850

(22) PCT Filed: Aug. 9, 2013

(86) PCT No.: PCT/US2013/054429
§ 371 (c)(1),
(2) Date: Jan. 5, 2016

(87) PCT Pub. No.: WO2015/020675
PCT Pub. Date: Feb. 12, 2015

(65) Prior Publication Data
US 2016/0176500 A1  Jun. 23, 2016

(51) Int. Cl.
*B64C 3/26* (2006.01)
*B29D 99/00* (2010.01)
(Continued)

(52) U.S. Cl.
CPC ............... *B64C 3/26* (2013.01); *B29C 70/30* (2013.01); *B29D 99/0014* (2013.01); *B64C 3/18* (2013.01);
(Continued)

(58) Field of Classification Search
CPC .. B64C 3/26; B64C 3/18; B29C 70/30; B29D 99/0014; B29K 2105/0872; Y02T 50/433
(Continued)

(56) References Cited

U.S. PATENT DOCUMENTS 7,303,374 B2    12/2007  Li et al.
2003/0037867 A1  2/2003  Bersuch et al.
(Continued)

FOREIGN PATENT DOCUMENTS

CN    102470915 A    5/2012
EP    1364871 A1    11/2003
(Continued)

OTHER PUBLICATIONS

Owens et al., Tension Pull-off and Shear Test Method to Characterize 3-D Textile Reinforced Bonded Composite Tee-Joints, American Society for Testing and Materials, pp. 398-409 (2001).
(Continued)

*Primary Examiner* — Brian Handville
(74) *Attorney, Agent, or Firm* — Miller, Matthias & Hull LLP

(57) ABSTRACT

A stiffened panel comprises a composite panel, and a stiffener including a base flange on the composite panel. The base flange is tapered towards the panel. The stiffened panel further comprises a composite overwrap layer on only the composite panel and a tapered surface of the base flange.

20 Claims, 7 Drawing Sheets

(51) Int. Cl.
B29C 70/30 (2006.01)
B64C 3/18 (2006.01)
B29K 105/08 (2006.01)

(52) U.S. Cl.
CPC ..... B29K 2105/0872 (2013.01); Y02T 50/433 (2013.01)

(58) Field of Classification Search
USPC ........................................ 428/157; 156/307.1
See application file for complete search history.

(56) References Cited

U.S. PATENT DOCUMENTS

| 2011/0284693 | A1 | 11/2011 | Barnard et al. |
| 2012/0061512 | A1 | 3/2012 | Stulc et al. |
| 2012/0100343 | A1* | 4/2012 | Borghini-Lilli ......... B29C 70/30 428/156 |
| 2012/0168071 | A1 | 7/2012 | Kennedy et al. |
| 2012/0292446 | A1 | 11/2012 | Kamarj et al. |

FOREIGN PATENT DOCUMENTS

| JP | 2012532785 A | 12/2012 |
| WO | 2011003844 A2 | 1/2011 |

OTHER PUBLICATIONS

Search Report for Related Chinese Application No. 2013800783556; report dated Jan. 25, 2017.

International Search Report and Written Opinion for related International Application No. PCT/US2013/054429; report dated Feb. 9, 2016.

Office Action for related Japanese Application No. 2016-533284; report dated Jul. 11, 2017.

* cited by examiner

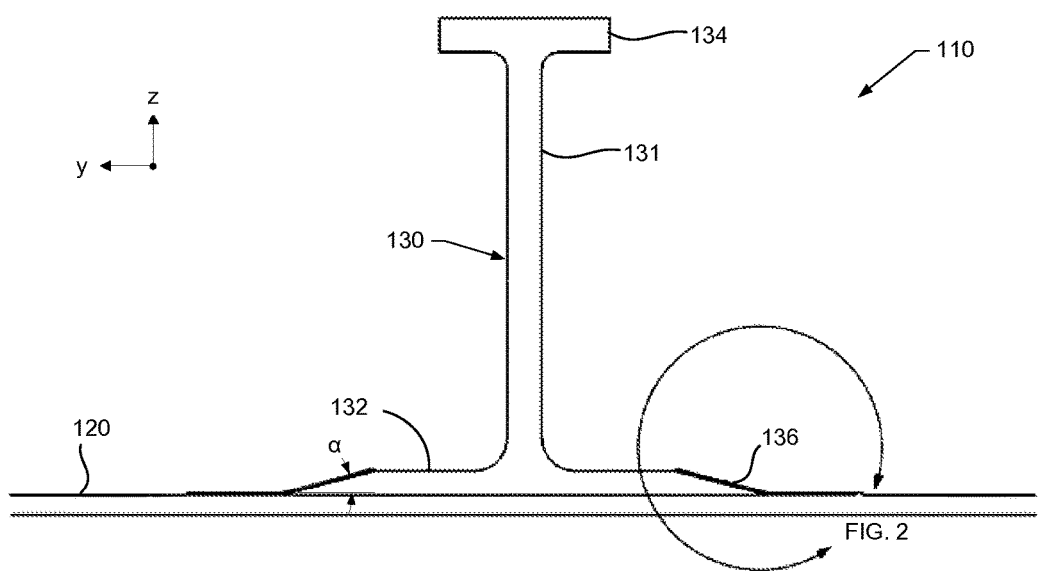
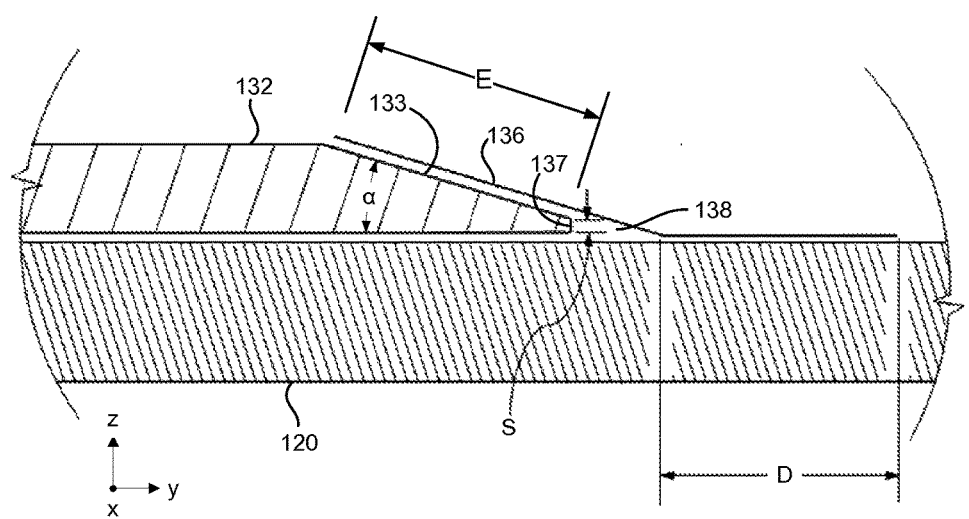

STIFFENED COMPOSITE PANELS

TECHNICAL FIELD

The technical field relates generally to composite panels and particularly to stiffened composite panels for aircraft.

BACKGROUND

Large stiffened composite panels are being used in new commercial aircraft. These panels include stiffeners co-bonded with composite webs and skin.

Co-bonding offers certain advantages over fastening stiffeners to webs and skin. Co-bonding can reduce or eliminate fastening operations (e.g., hole generation and fastener installation), thereby reducing complexity, weight, cost of materials, tooling costs, inventory, and manufacturing flow time However, co-bonding can produce undesirable effects such as ply wrinkles, adhesive pockets, and resin pockets. These effects are typically formed at stiffener edges.

A need exists for a composite panel including stiffeners co-bonded with composite webs and skin, without having such undesirable effects.

SUMMARY

According to a configuration herein, a stiffened panel comprises a composite panel, and a stiffener including a base flange on the composite panel. The base flange is tapered towards the panel. The stiffened panel further comprises a composite overwrap layer on only the composite panel and a tapered surface of the base flange.

According to another configuration herein, a method comprises placing a stiffener and an overwrap layer on an uncured composite panel. The stiffener includes a tapered base flange. The overwrap layer is only on a tapered surface of the tapered base flange, and an adjacent portion of the composite panel.

According to another configuration herein, an aircraft assembly having a direction of primary loading comprises composite skin, and a stiffening substructure for the skin. The stiffening substructure includes base flanges that are tapered in the direction of primary loading. The aircraft assembly further comprises a plurality of overwrap layers. Each overwrap layer starts from a tapered surface of a corresponding base flange and extends to the skin.

These features and functions may be achieved independently in various configurations or may be combined in other configurations. Further details of the configurations can be seen with reference to the following description and drawings.

BRIEF DESCRIPTION OF THE DRAWINGS

FIG. 1 is an illustration of a stiffened panel including a composite panel, stiffener, and overwrap layers.

FIG. 2 is an illustration of the overwrap layer bridging the panel and a base flange of the stiffener of FIG. 1.

DETAILED DESCRIPTION

Figure 3A:
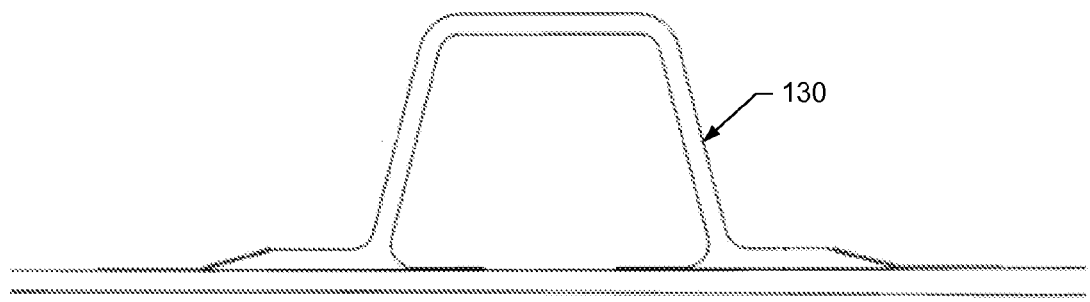
FIGS. 3A-3C are illustrations of different cross-sections for a stiffener of an aircraft.

Reference is made to FIG. 1, which illustrates a stiffened panel 110. The stiffened panel 110 includes a panel 120 made of composite material. In some configurations, the composite material may be a fiber-reinforced plastic. The composite panel 120 may be flat or it may have curvature. Examples of a composite panel 120 for an aircraft include, without limitation, skin and web. Examples of skin include, without limitation, aircraft wing skin. Aircraft skin typically has an aero surface, whereas an aircraft web does not.

The stiffened panel 110 further includes stiffeners 130 for stiffening the composite panel 120. The stiffeners 130 are not limited to any particular geometry. In some configurations, the stiffeners 130 may be beams. Examples of stiffeners 130 for aircraft include, without limitation, stringers, spars, other spanwise beams, and chords.

A single stiffener 130 is illustrated in FIG. 1. That stiffener 130 includes a base flange 132 that is on the composite panel 120. In some configurations, the base flange 132 may be made of a composite material such as fiber reinforced plastic. In other configurations, the base flange 132 may be made of metal. The stiffener 130 may have other elements, such as a web 131 and cap flange 134. Those other elements 131 and 134 may be formed of metal or a composite material such as fiber-reinforced plastic.

The base flange 132 is tapered, which means that at least one side or end of the base flange 132 is tapered down towards the composite panel 120. Angle ($\alpha$) of the taper is less than 45 degrees. FIG. 1 shows two sides of the base flange 132 that are tapered transversely. Consider the x-y-z coordinate system illustrated in FIG. 1. The x-axis corresponds to the longitudinal direction of the stiffener 130, the y-axis corresponds to the transverse direction, and the z-axis corresponds to the normal direction. The transverse taper is in the y-z plane.

Ends of the base flange 132 may be tapered longitudinally. The longitudinal taper is in the x-z plane.

In some configurations, only sides of the base flange 132 are tapered transversely. In some configurations, only ends of the base flange 132 are tapered longitudinally. In some configurations, all sides and ends of the base flange 132 are tapered.

Additional reference is made to FIG. 2. The taper of the base flange terminates at a height (S) of 0.050 inches or less.

The taper of the base flange 132 enables the base flange 132 to flex with the panel 120. This increased flexibility reduces stress concentration at the bond line, and it enables the base flange 132 to flex with a buckled panel 120, thereby increasing the strength capability of the stiffened panel 110.

The stiffened panel 110 further includes an overwrap layer 136 for each tapered side. Each overwrap layer 136 is on both the composite panel 120 and a corresponding tapered surface 133 of the base flange 132. Each overwrap layer 136 may include at least two plies. Each overwrap layer 136 may include one or more uncured plies. As a first example, the plies may include biased weave fabric with both layers oriented +45/−45 degrees relative to a primary direction of loading. As a second example, one or more plies may be oriented 0/90 degrees and one layer oriented +45/−45 degrees relative to a primary direction of loading.

Consider the overwrap layer 136 illustrated in FIG. 2. The overwrap layer 136 bridges the base flange 132 and the panel 120. The overwrap layer 136 engages sufficient portions of both the tapered surface 133 and the composite panel 120 to meet structural requirements (that portion of the composite panel 120 is referenced by the letter D, and that portion of the tapered surface 133 is referenced by the letter E). A volume 138 is formed between the composite panel 120, the base flange 132, and the overwrap layer 136. A ply wrinkle (not shown) can form within the volume 138. A nugget of adhesive or resin (not shown) can also form within the volume 138.

The overwrap layer 136 provides an alternate load path to bypass loads around a ply wrinkle, thereby increasing capability regardless of ply wrinkle size. The combination of the stiffener 130, overwrap layer 136 and composite panel 120 reduces the formation of adhesive pockets, resin pockets, and ply wrinkles.

In some configurations, the stiffened panel 110 may include only stiffeners 130 having base flanges 132 and overwrap layers 136. In some configurations, the stiffened panel 110 may include a combination of conventional stiffeners and stiffeners 130 having tapered base flanges 132 and overwrap layers 136.

Figure 3B:
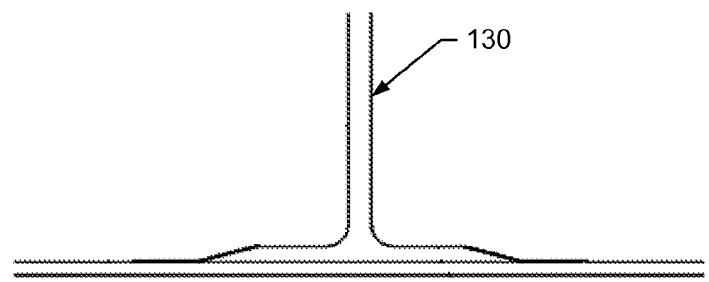
Figure 3C:
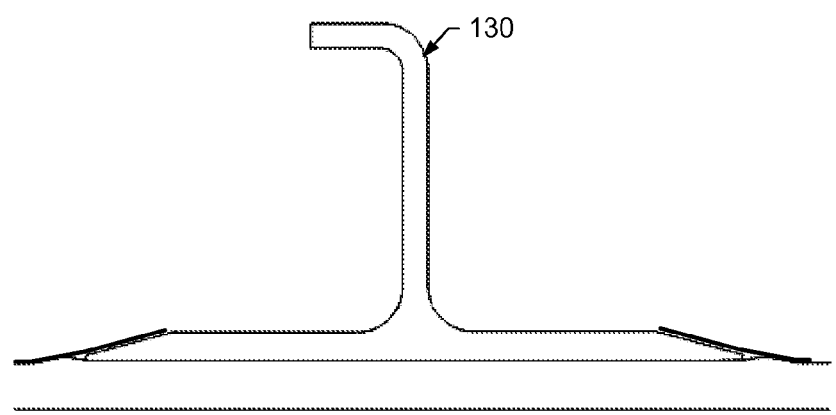

FIG. 1 shows the stiffener 130 with an I-shaped cross section. However, a stiffener 130 is not so limited. Other cross-sections for the stiffener 130 include, but are not limited to, a hat cross section (FIG. 3A), a T-shaped cross section (FIG. 3B), and a J-shaped cross section (FIG. 3C).

Figure 4A:
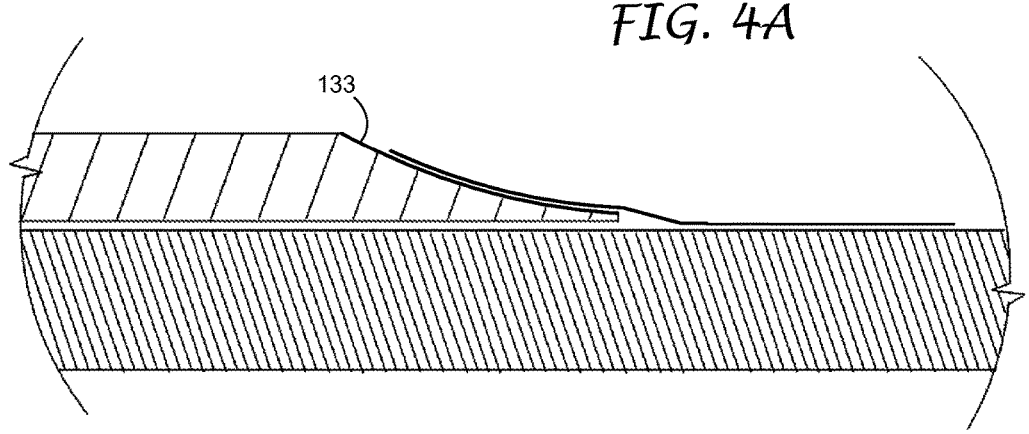
FIGS. 4A-4F are illustrations of different tapers and edges for a base flange of a stiffener.
Figure 4B:
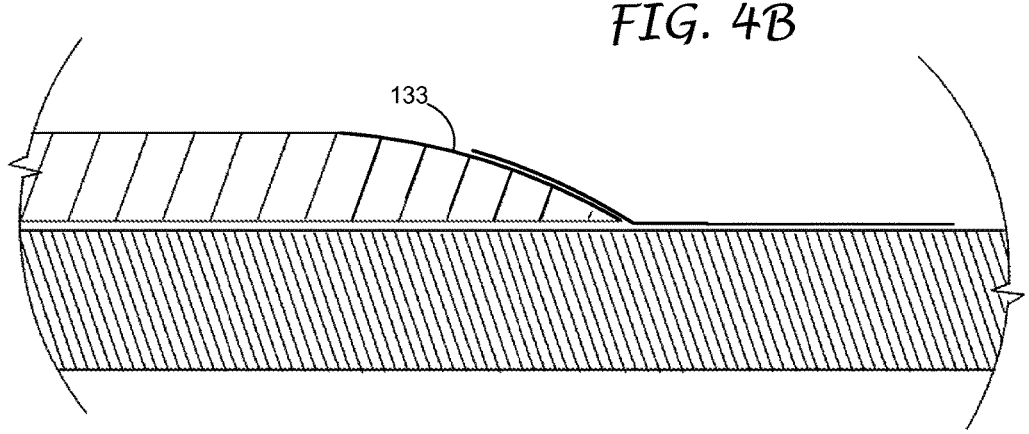
Figure 4C:
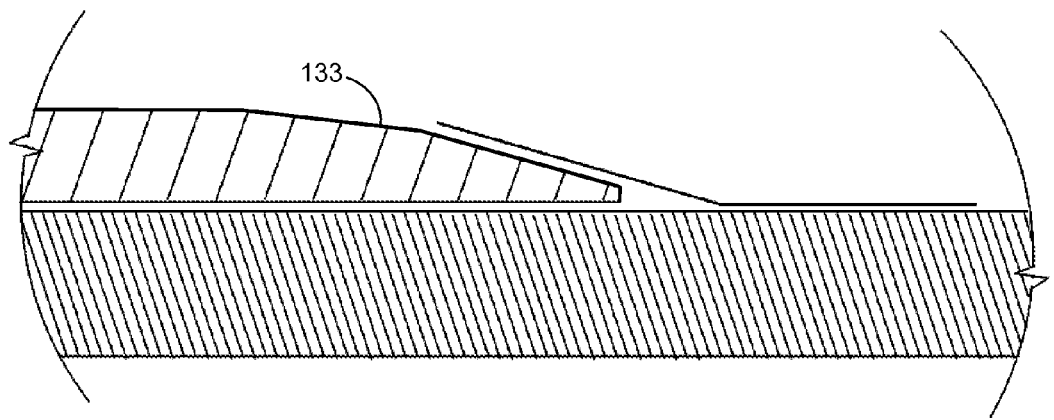

FIGS. 1, 2 and 3A-3C show tapered surfaces 133 that are straight. However, the stiffener 130 is not so limited. In some configurations, the tapered surface 133 is radiused. Radius of the tapered surface 133 may be inward (FIG. 4A) or outward (FIG. 4B). In some configurations, the tapered surface 133 has a complex or a compound taper (FIG. 4C).

Figure 4D:
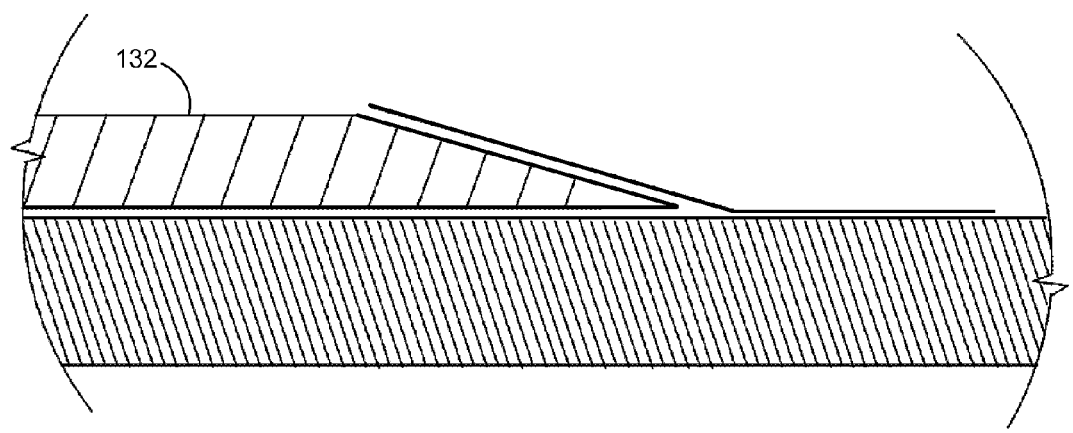

As mentioned above, the taper terminates at a height of no more than 0.050 inches. In some configurations, the base flange 132 is tapered down to a knife edge (see FIG. 4D). The knife-edge taper minimizes the formation of wrinkles in the skin, adjacent the base flange 132.

In some configurations, the tapered base flange 132 terminates at a step. Height of the step is greater than a knife edge but no greater than 0.050 inches. The step ensures proper part width. However, wrinkles resulting from the step are typically larger than those resulting from the knife edge. The larger wrinkles are caused by a lower pressure zone created by bridging during cure.

Figure 4E:
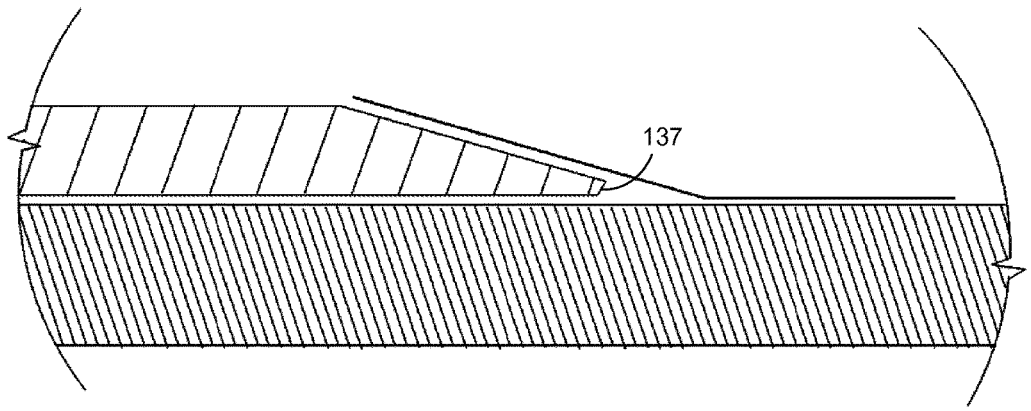
Figure 4F:
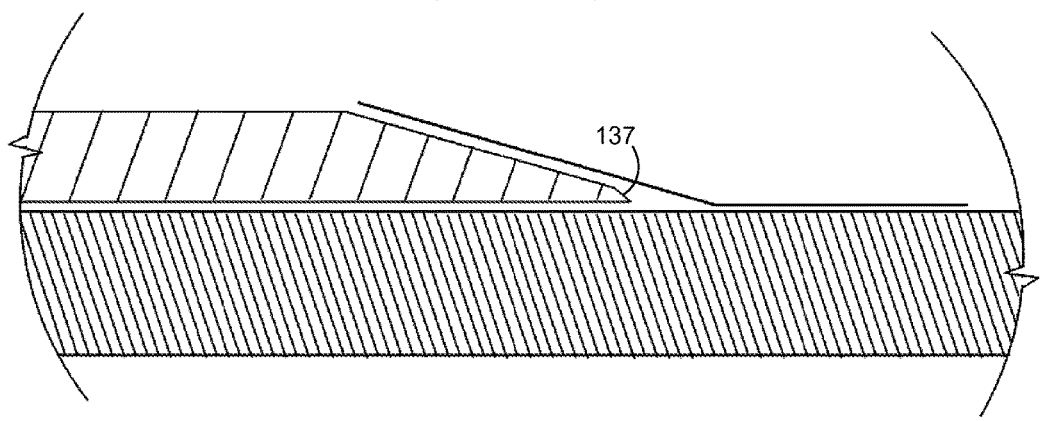

FIG. 2, for example, shows the taper terminating in step that is normal to the composite panel 120. However, the stiffener 130 is not so limited. In other configurations, however, the step 137 may be angled inward (FIG. 4E) or outward (FIG. 4F).

In some configurations, the overwrap layer 136 extends along the entire side of the base flange 132. In other configurations, the overwrap layer 136 is discontinuous along the side of the base flange 132. For instance, the transversely tapered base flange 132 is fastened to the composite panel 120 with fasteners that are spaced apart along the side of the base flange 132. Portions of the overwrap layer 136 extend between fasteners but not over the fasteners.

Figure 5A:
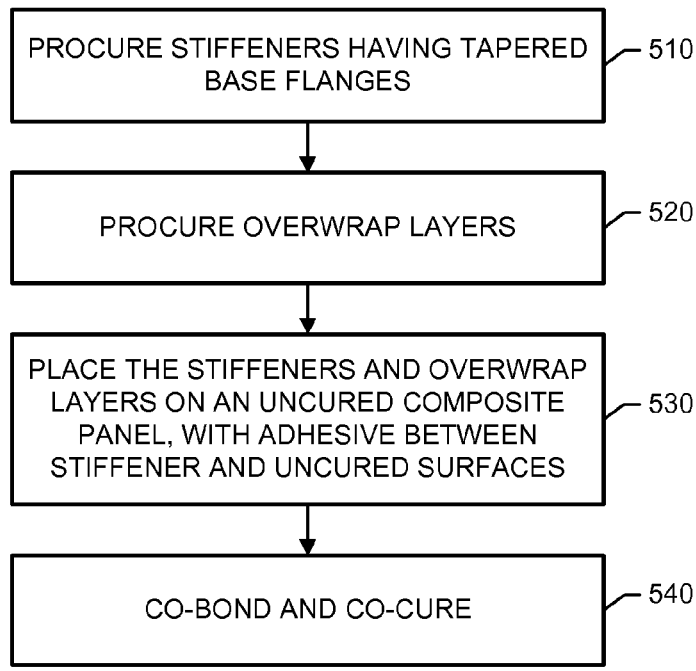
FIGS. 5A-5C are illustrations of methods of fabricating a stiffened panel.

Reference is now made to FIG. 5A, which illustrates a method of fabricating a stiffened composite panel. At block 510, stiffeners having tapered base flanges are procured. Procurement may include purchasing the stiffeners, fabricating them, or a combination of the two. As a first example of procuring a stiffener, a cured composite stiffener having a conventional geometry is purchased, and its flange is thereafter machined to produce tapered surfaces. As a second example of procuring a composite stiffener, plies of reinforcing fibers are stacked up to form a web, base flange, and cap flange, with tapered surfaces being formed in the base flange. The composite ply stack is then cured. As a third example, a stiffener having a tapered base flange is purchased.

At block 520, overwrap layers are procured. For example, fabric for plies of the overwrap layer is cut.

At block 530, the stiffeners and the uncured overwrap plies are placed on an uncured composite panel. The plies of the overwrap layers are placed in proper orientation on the tapered surfaces of the base flanges. A portion of each overwrap layer will overhang each base flange. Each overhanging portion is stacked on the uncured panel. The cut fabric may be pre-impregnated with a resin, and adhesive may be placed on the tapered surfaces.

If the panel has a primary direction of loading, the stiffeners may be oriented on the uncured panel such that the tapers are in the primary direction. Likewise, the plies of the overwrap layer may be oriented with respect to the primary direction.

Adhesive is placed between the base flange surfaces and the uncured surfaces. Thus, adhesive is placed between a tapered surface of the base flange and a contacting surface of the uncured overwrap layer, and adhesive is placed between contacting surfaces of the base flange and the uncured panel.

At block 540, the panel, stiffeners, and overwrap layers are heated under pressure. For example, the panel, stiffeners and overwrap layers are bagged and placed in an autoclave. As a result, the base flanges of the stiffeners are co-bonded to both the panel and the overwrap layers, and the overwrap layers are co-cured with the panel.

The method of FIG. 5A can produce a stiffened panel that is partly or entirely composite, depending on the composition of the stiffeners.

Figure 5C:
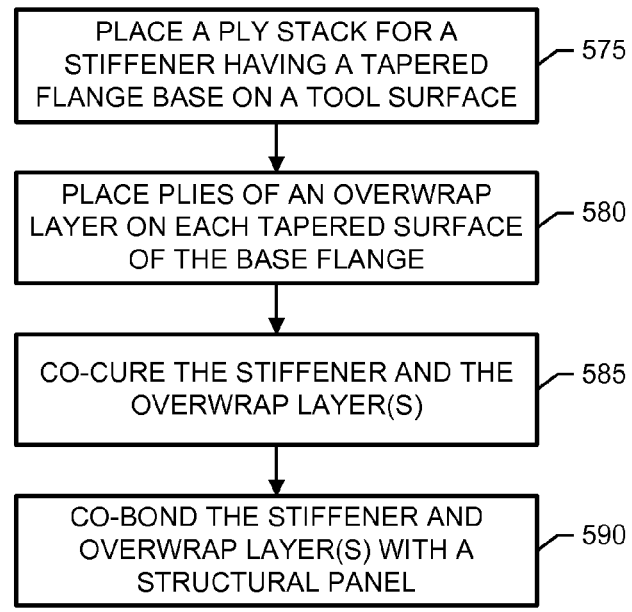
Figure 5B:
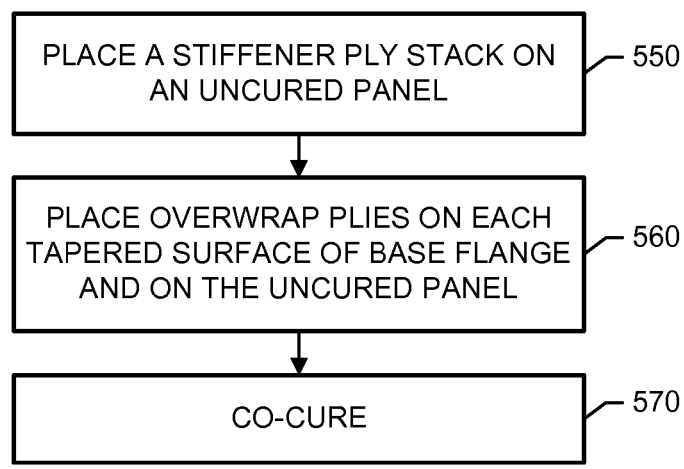

Reference is now made to FIG. 5B, which illustrates another method of fabricating a stiffened composite panel. In the method of FIG. 5B, the stiffener is formed on the uncured panel and co-cured with the panel and the overwrap layer.

At block 550, a ply stack for a stiffener is placed on an uncured panel. The ply stack has a tapered base flange.

At block 560, plies of an overwrap layer are placed in proper orientation on each tapered surface of the base flange. Overhanging portions of each overwrap layer are placed on the uncured panel.

At block 570, the stiffener, panel, and overwrap layer are cured. For example, the panel, stiffener and overwrap layer are bagged, placed in an autoclave, and heated under pressure.

Reference is now made to FIG. 5C, which illustrates another method of fabricating a stiffened composite panel. In the method of FIG. 5C, the stiffener and the overwrap layer are co-cured, and the co-cured structure is thereafter co-bonded with the panel.

At block 575, a ply stack for a stiffener having a tapered flange base is placed on a tool surface. At block 580, plies of an overwrap layer are placed in proper orientation on each tapered surface of the base flange. Overhanging portions of each overwrap layer are placed against the tool surface.

At block 585, the stiffener with tapered edge and overwrap layer(s) are co-cured. For example, the stiffener and overwrap layer(s) are bagged, placed in an autoclave, and heated under pressure.

At block 590, the co-cured stiffener with taper and overwrap layer(s) is co-bonded to a structural panel. At the time of co-bonding, the structural panel may be either cured or uncured composite material or some other material.

A stiffened panel herein is not limited to any particular application. However, one application of particular interest to the assignee is an aircraft.

Figure 6:
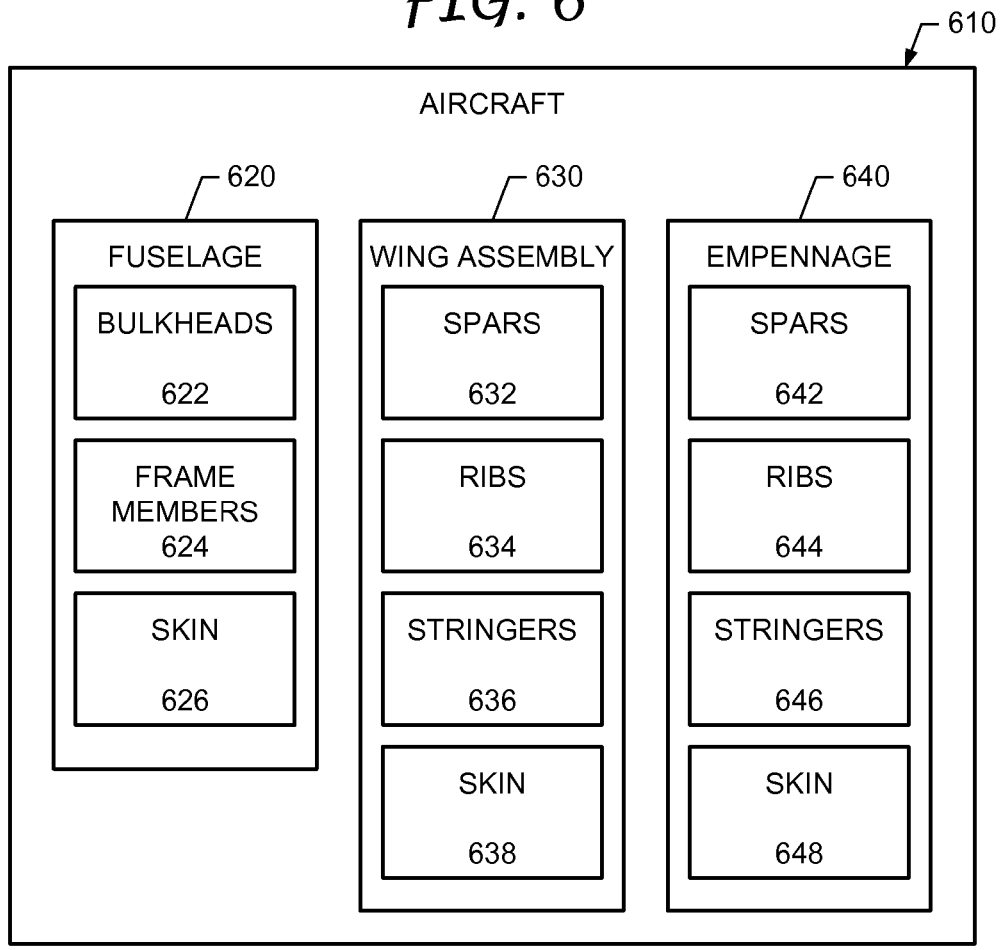
FIG. 6 is an illustration of an aircraft.

Reference is made to FIG. 6, which illustrates an aircraft 610. The aircraft 610 includes a fuselage 620, a wing assembly 630, and empennage 640. Each of these assemblies 620-640 includes a stiffening substructure.

The stiffening substructure of the wing assembly 630 includes front and rear spars 632 extending in a spanwise direction, ribs 634 extending between the spars 632 in a chordwise direction, stringers 636 also extending in a spanwise direction, and upper and lower skin 638 covering the spars 632 and ribs 634. The wing assembly 630 may also include mid-spars 632 extending in a spanwise direction.

The spars 632 may be co-bonded with composite panels of the skin 638. The spars 632 are subjected to axial loading. Ends of the spar base flanges may be tapered in the (spanwise) direction of the axial loading. Overwrap layers extend from tapered surfaces to the skin 638.

The front spars 632 are also subject to transverse loading. Sides of the front spar base flanges may be tapered in the (chordwise) direction of the transverse loading. Overwrap layers extend from tapered surfaces to the skin 638.

The ribs 634 and stringers 636 may also be co-bonded to panels of the skin 638. Sides of the rib base flanges may be tapered to the skin 638 in the spanwise direction, and sides of the stringer base flanges may also be tapered chordwise. Overwrap layers extend from tapered surfaces to the skin 638.

In some configurations, the wing assembly 630 includes outboard wings cantilevered from a central wing box. A wing panel may include spanwise stiffeners that are subject to high tensile loads. These stiffeners may have their base flanges tapered spanwise to the skin 638, and overwrap layers may extend from the tapered surfaces to the skin 638.

The empennage 640 includes horizontal and vertical stabilizers. The stiffening substructure of each stabilizer includes spars 642, ribs 644, stringers 646, and skin 648. The ribs 644 and stringers 646 may be tapered to the skin 648 in the spanwise direction. The spars 642 and stringers 646 may be tapered to the skin 648 in forward and aft directions. Overwrap layers may extend from tapered surfaces to the skin 648.

The fuselage 620 includes bulkheads 622, which are stiffened webs that function as pressure barriers. Base flanges of bulkhead frames are co-bonded to webs. The base flanges may be tapered to the webs in forward and aft directions. Overwrap layers may extend from tapered surfaces to the webs.

The stiffening substructure of the fuselage 620 includes hoop-shaped frame members 624, which are secured to skin 626. Base flanges of the frame members 624 may be tapered to the skin 626 in forward and aft directions. Overwrap layers may extend from tapered surfaces to the skin 626.

The invention claimed is:

1. A stiffened panel comprising:
   a composite panel;
   a stiffener including a base flange extending parallel to the composite panel, and having a thickness defining a first surface distal to the composite panel and an opposed surface proximal to and secured on the composite panel,
   the base flange including a tapered surface extending over only a portion thereof, the tapered surface being distal to the composite panel, and angled towards the composite panel; and
   a composite overwrap layer that overlies only a portion of the composite panel and only the tapered surface of the base flange.

2. The stiffened panel of claim 1, wherein the overwrap layer is co-bonded to the base flange and co-cured with the composite panel.

3. The stiffened panel of claim 1, wherein the overwrap layer, the base flange and the composite panel are co-cured.

4. The stiffened panel of claim 1, wherein the overwrap layer is co-cured with the stiffener, and the co-cured stiffener and overwrap layer are co-bonded with the composite panel.

5. The stiffened panel of claim 1, wherein a first and a second side of the base flange are tapered; and
   wherein a first overwrap layer is on both the composite panel and a tapered surface of the first side, and a second overwrap layer is on the composite panel and a tapered surface of the second side.

6. The stiffened panel of claim 1, wherein the base flange is tapered to a knife-edge.

7. The stiffened panel of claim 1, wherein the base flange terminates in a step having a height of no more than 0.050 inches; wherein a volume is between the composite panel, the base flange, and the overwrap layer; and wherein a ply wrinkle is within the volume.

8. The stiffened panel of claim 1, wherein the taper is a straight taper.

9. The stiffened panel of claim 1, wherein the taper is a radius.

10. The stiffened panel of claim 1, wherein the taper is compound.

11. The stiffened panel of claim 1, wherein the stiffener is made of composite material.

12. The stiffened panel of claim 1, wherein the composite panel is one of an aircraft skin and an aircraft web.

13. The stiffened panel of claim 1, wherein the composite panel is a skin of an aircraft wing; and wherein the stiffener is one of a spar, rib and stringer.

14. A method comprising placing a stiffener and an overwrap layer on an uncured composite panel, the stiffener including a base flange extending parallel to the composite panel, and having a thickness defining a first surface distal to the composite panel and an opposed surface proximal to and secured on the composite panel, the base flange including a tapered surface extending only over a portion of the base flange, wherein the overwrap layer is on only the tapered surface of the base flange and an adjacent portion of the composite panel, the tapered surface being distal to the composite panel and angled towards the composite panel, wherein the composite overwrap layer overlies only a portion of the composite panel and only the tapered surface of the base flange.

15. The method of claim 14, further comprising co-bonding the base flange to both the panel and the overwrap layer and co-curing the overwrap layer with the panel.

16. The method of claim 14, wherein the stiffener is made of a composite material comprising fiber-reinforced plastic that is cured and machined to produce the tapered base flange, the curing and machining performed prior to placing the stiffener on the panel.

17. The method of claim 14, further comprising fabricating the stiffener, including forming a composite ply stack having a tapered base flange; and curing the ply stack.

18. The method of claim 14, wherein placing the stiffener on the panel includes placing a composite ply stack on the uncured panel, the ply stack having a tapered base flange; wherein placing the overwrap layer includes placing uncured plies on the tapered surface of the base flange; and wherein the method further comprises co-curing the panel, stiffener and overwrap layer.

19. An aircraft assembly having a direction of primary loading, the assembly comprising:
    a composite skin;
    a stiffening substructure for the composite skin, the stiffening substructure including base flanges that are tapered in the direction of primary loading and that extend parallel to the composite skin, each base flange having a thickness defining a first surface distal to the composite skin and an opposed surface proximal to and secured on the composite skin; and a plurality of overwrap layers, each overwrap layer starting from a tapered surface of a corresponding base flange and extending to the composite skin; wherein each tapered surface is distal to the composite skin, and angled towards the composite skin, wherein each overwrap layer overlies only a portion of the composite skin and only the tapered surface of each base flange, and wherein each tapered surface of a corresponding base flange extends only over a portion of that corresponding base flange.

20. The aircraft assembly of claim 19, wherein the composite skin is a wing skin; and wherein the stiffening substructure further comprises at least one of spars, ribs and stringers having the base flanges.

\* \* \* \* \*